US009672093B2

(12) United States Patent
Friman et al.

(10) Patent No.: US 9,672,093 B2
(45) Date of Patent: Jun. 6, 2017

(54) WIRELESS CONTROL FOR PROCESS AUTOMATION

(75) Inventors: Mats Friman, Tampere (FI); Joona Nikunen, Pirkkala (FI)

(73) Assignee: VALMET AUTOMATION OY, Espoo (FI)

(*) Notice: Subject to any disclaimer, the term of this patent is extended or adjusted under 35 U.S.C. 154(b) by 596 days.

(21) Appl. No.: 14/131,521

(22) PCT Filed: Jul. 11, 2011

(86) PCT No.: PCT/FI2011/050649
§ 371 (c)(1),
(2), (4) Date: Jan. 8, 2014

(87) PCT Pub. No.: WO2013/007867
PCT Pub. Date: Jan. 17, 2013

(65) Prior Publication Data
US 2014/0359367 A1 Dec. 4, 2014

(51) Int. Cl.
*G06F 11/07* (2006.01)
*G05B 9/02* (2006.01)
*G05B 19/401* (2006.01)

(52) U.S. Cl.
CPC ............. *G06F 11/079* (2013.01); *G05B 9/02* (2013.01); *G05B 19/401* (2013.01); *G05B 2219/24015* (2013.01)

(58) Field of Classification Search
None
See application file for complete search history.

(56) References Cited

U.S. PATENT DOCUMENTS

| 5,341,663 A | * | 8/1994 | Knapp | ................. G05B 13/042 700/122 |
| 5,901,059 A | * | 5/1999 | Tao | ...................... G05B 13/048 700/29 |

(Continued)

FOREIGN PATENT DOCUMENTS

FI 990360 A 8/2000
WO WO 2005/124487 A1 12/2005

OTHER PUBLICATIONS

Written Opinion of the International Searching Authority issued in International Application No. PCT/FI2011/050649 mailed Apr. 20, 2012.
Årzén, "A Simple Event-Based PID Controller," *14th World Congress of IFAC*, Jan. 1999, pp. 1-6.
Björkbom, "Wireless Control System Simulation and Network Adaptive Control," Ph.D thesis, Control Engineering Report 167, Aalto University, School of Engineering and Technology, Oct. 2010, pp. 1-173.

(Continued)

*Primary Examiner* — Ryan Jarrett
(74) *Attorney, Agent, or Firm* — Oliff PLC

(57) ABSTRACT

A control loop includes a process controller for controlling a field device in a process. A remote measurement transmitter measures a desired process variable and transmits the measured variable as a wireless measurement signal to a wireless interface unit on the controller side. The interface unit passes the received measurement signal, and a trigger signal indicating a reception of a new measurement, to an adaptive estimator. When triggered by a trigger signal from the wireless interface, i.e. when a new measurement value is received, the adaptive estimator outputs the new value measurement value to the process controller. Otherwise, between consecutive trigger signals, the adaptive estimator generates an estimated measurement value that gradually moves towards a setpoint according to a predetermined estimation algorithm or process.

18 Claims, 5 Drawing Sheets

(56) References Cited

U.S. PATENT DOCUMENTS

| | | | |
|---|---|---|---|
| 6,094,602 A * | 7/2000 | Schade, III | G05B 5/01 700/29 |
| 6,546,295 B1 | 4/2003 | Pyötsiä et al. | |
| 6,825,631 B1 * | 11/2004 | Nakamura | G05B 21/02 318/560 |
| 7,113,834 B2 * | 9/2006 | Wojsznis | G05B 11/42 700/31 |
| 7,181,295 B2 * | 2/2007 | Yu | G05B 5/01 700/42 |
| 7,587,252 B2 | 9/2009 | Blevins et al. | |
| 7,620,460 B2 | 11/2009 | Blevins et al. | |
| 2003/0149493 A1 * | 8/2003 | Blevins | G05B 13/048 700/18 |
| 2009/0299495 A1 * | 12/2009 | Blevins | G05B 11/42 700/28 |

OTHER PUBLICATIONS

Sinopoli et al., "Kalman Filtering with Intermittent Observations," *IEEE Transactions on Automatic Control*, Sep. 2004, vol. 29, No. 9, pp. 1453-1464.

Mo et al., "Feedback Control over Packet Dropping Network Links," *2007 Mediterranean Conference on Control and Automation*, Jul. 2007, pp. 1-6.

"PID Modifications for Unreliable Communications," Emerson Project Management, 2006, pp. 1-10.

Song et al., "Improving PID Control with Unreliable Communications," *ISA EXPO 2006*, Oct. 2006, pp. 1-12.

International Search Report issued in International Patent Application No. PCT/FI2011/050649 mailed Apr. 20, 2012.

* cited by examiner

WIRELESS CONTROL FOR PROCESS AUTOMATION

FIELD OF THE INVENTION

The invention relates to a wireless control in process automation.

BACKGROUND OF THE INVENTION

Process control systems control an industrial process by means of various field devices, e.g. regulating devices, control devices, sensors, transmitters and the like, which are connected to the process. A typical field device is a control valve provided with a valve controller. A field device is typically controlled by a process controller using a suitable control algorithm on the basis of the measurement results (feedback) obtained from the process and the set values. Thus, a so-called control loop is formed. An example of a closed-loop control is shown schematically in FIG. 1. A control loop may comprise e.g. a process controller 2 controlling a field device in a process 4 and a measured feedback from the process 4 to the process controller 2. Measurement sensor/transmitter 6 measures the process variable (temperature, pressure, level, flow, or analysis) and converts the measured process variable to units useful to the controller (psig, kPa, etc) or some electronic value such as 4-20 mA. The measurement sensor/transmitter 6 may be connected directly to the process 4 and transmit the variable to be controlled to the controller 2, usually some distance away, e.g. over a wired or wireless connection or network. The controller 2 makes a comparison between the desired control point yset (set point) and the measured control point ymes and reacts to the difference, deviation or error according to a preset control action or algorithm. For illustrative purposes, the comparison function 8 and the resulting error signal are shown separate from remaining part of the controller 2. The action in the controller 2 can be any control scheme suitable for the process to be controlled, such as PID (Proportional, Integral, Derivative control). The output signal from the controller 2 controls the desired process variable either directly or indirectly. For example, the controller 2 may position a control valve. Process changes, i.e. changes in the process variable resulting from the valve changes are measured by the measurement sensor/transmitter 6 and the procedure continues. All sections of the control system may be continuously connected, even though action does not take place unless a change takes place that results in the process variable measured deviating from the set point (desired control point).

Traditionally all connections in automation system have been provided by wired connections, e.g. cables. However, there is an increasing interest of using wireless sensor/transmitters in feedback loops in order to the need for expensive cabling of sensors. Use of wireless transmitters provides a new degree of flexibility in reconfiguring the process without installing or relocating transmitter wiring. There is also more freedom if the monitored process is far away from the controller or if the process is very wide, and it is difficult (and sometimes impossible) to use wired coupling.

Although the measurements are sent periodically from the sensor/transmitter, the same measurement may take different routes in the wireless network, which results in non-periodic reception of measurements and varying delay (jitter). Another typical feature is connection breaks, with lost packages. The controller must take into account that up to 100% of packets may be lost during (temporary) communications breaks. Otherwise, the closed-loop system may become unstable. One approach to address the problem of unreliable communications is a PID PLUS controller disclosed in U.S. Pat. No. 7,587,252, U.S. Pat. No. 7,620,460, and US2009/0299495, for example. The PID PLUS controller is capable of adapting to the non-periodic measurements by taking into account the time passed since the previous measurement update. More specifically the integral and derivative actions of the PID PLUS controller are calculated over the time interval between two consecutively received measurements. Thus, integral and derivative depend on the time between the previous received measurements and they are only calculated then a new measurement has arrived. If no new measurement is received, the output of the controller is constant. A disadvantage of this approach is that standard PID controller cannot be used.

Karl-Erik Årzén: "A Simple Event-Based PID Controller". In Preprints 14th World Congress of IFAC, Beijing, P.R. China, January 1999, proposes an event-based PID in which integral (I) and derivative (D) controls are dependent on an instantaneous control interval. A problem of this approach is that it is not robust but the control becomes instable during long breaks in communication.

A networked PID and a steady-state heuristic PID controller are two theoretical approaches proposed by M. Björkbom, "Wireless Control System Simulation and Network Adaptive Control," Ph.D. thesis, Control Engineering report 167, Aalto University, School of Science and Technology, October, 2010. In the networked PID approach a PID controller is split into two parts and distributed over the network such that part of the algorithm is at the sensor. Thus, a "smart sensor" with some computational abilities is needed. A reference signal (set point) is also needed. On the sensor side the error, integral error and derivative error are calculated and transmitted to the controller where the final control output is calculated. In this approach, the error estimates calculated at the sensor side are always exact. Whenever the controller receives update estimates from the sensor, the control output is correct. If no data from the sensor is received, the previously received values can be held. A disadvantage of this approach is that the sensor must be aware of setpoint, which is very problematic in practice. In the steady-state heuristic PID controller approach an approximate closed-loop step response is a rough estimate of the output behaviour, when the actual measurement feedback information is unavailable. Using this estimate, the control can continue to bring the process into a desired steady-state, although measurements are not updated. A disadvantage of this approach is that a process model is needed.

BRIEF DESCRIPTION OF THE INVENTION

An object of the invention is to provide a process control which is tolerant to problems in communication of process measurements. This object of the invention is achieved by the subject matter of the attached independent claims. The preferred embodiments of the invention are disclosed in the dependent claims.

An aspect of the invention is a method of providing process measurements to a process controller of an industrial process, comprising receiving communication from a remote measurement device measuring at least one process parameter in a process, said communication carrying measured values of said at least one process parameter, inputting said received process measurement values to a process controller, if the communication from the remote measurement device fails, inputting estimated process measurement values to the process controller, said estimated process measurement values being generated based at least on the last received process measurement value and a setpoint signal.

Another aspect of the invention is a method of providing process measurements to a process controller of an industrial process, comprising receiving communication from a remote measurement device measuring at least one process parameter in a process, said communication carrying measured values of said at least one process parameter, inputting an error signal between said received process measurement values and a setpoint signal to a process controller, if the communication from the remote measurement device fails, inputting an error signal between estimated process measurement values and a setpoint signal to the process controller, said estimated process measurement values being generated based at least on the last received process measurement value and a setpoint signal.

In an embodiment of the invention said generating of the estimated process measurement value comprises gradually increasing or decreasing the estimated process measurement values from the last received process measurement value towards the setpoint value according to a predetermined estimation process until reception of a next process measurement value, and upon receiving the next process measurement value, updating the estimated process measurement value with the received next process measurement value.

In an embodiment of the invention said predetermined estimation process implements a lowpass filter function which is reset by received process measurement values.

In an embodiment of the invention a gain and/or a time constant of the predetermined estimation process is fixed or dependent on a time interval between two consecutively received process measurement values.

In an embodiment of the invention the predetermined estimation process implements a filter yest(new)=(1−a)*yset+a*yest(old), where yest (new)=new estimated process measurement value, yest (old)=previous estimated process measurement value, yset=setpoint value, a is a parameter, used in the implementation of the filter.

In an embodiment of the invention a=exp(−Ts/T), where

Ts=sampling time in generating estimated process measurement values,

T=time constant, which is preferably an estimated closed-loop time constant of the control loop.

In an embodiment of the invention the method comprises providing a failure indication to the process controller during long breaks in the communication from the remote measurement device.

In an embodiment of the invention the method comprises providing a failure indication to the process controller during long breaks in the communication from the remote measurement device, when a predefined time has passed after reception of the last process measurement value, said predefined time being longer than a nominal time between two consecutive received measurement values during a normal communication.

In an embodiment of the invention the failure indication is provided by a communication interface receiving the communication from the remote measurement device.

In an embodiment of the invention the failure indication is provided in association with generating the estimated process measurement parameters.

In an embodiment of the invention the communication comprises a wired communication, a wireless communication, or a combination thereof.

A further aspect of the invention is an apparatus of providing process measurements to a process controller of an industrial process, said apparatus comprising a measurement estimator configured to implement a method according to any one of above embodiments.

A further aspect of the invention is a system, comprising a process controller, a process controlled by the process controller, a remote measurement device measuring at least one process parameter in the process, and a measurement estimator configured to implement a method according to any one of above embodiments.

A further aspect of the invention is a computer program comprising program code for performing a method according to any one of above embodiments when said program is run on a computer.

A further aspect of the invention is a computer program product comprising program code means stored on a computer readable medium for performing a method according to any one of above embodiments when said program product is run on a computer.

BRIEF DESCRIPTION OF DRAWINGS

In the following the invention will be described in greater detail by means of exemplary embodiments with reference to the attached drawings, in which.

DESCRIPTION OF EXEMPLARY EMBODIMENTS

Figure 1:
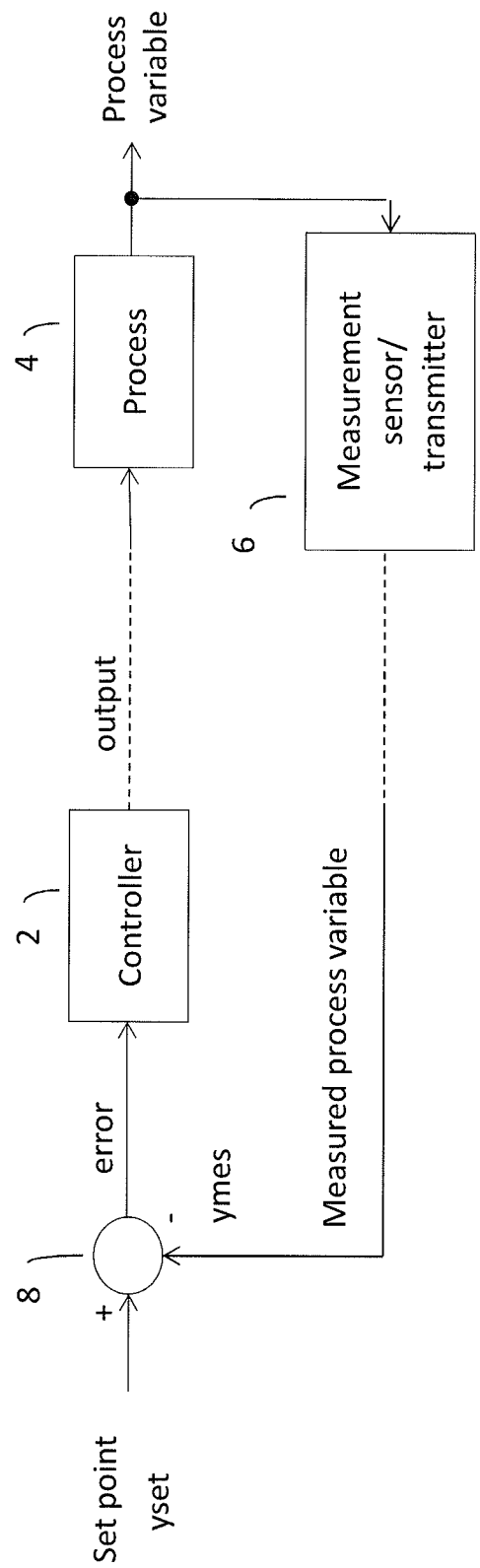
FIG. 1 is a schematic block diagram illustrating a typical closed-loop control.
Figure 2:
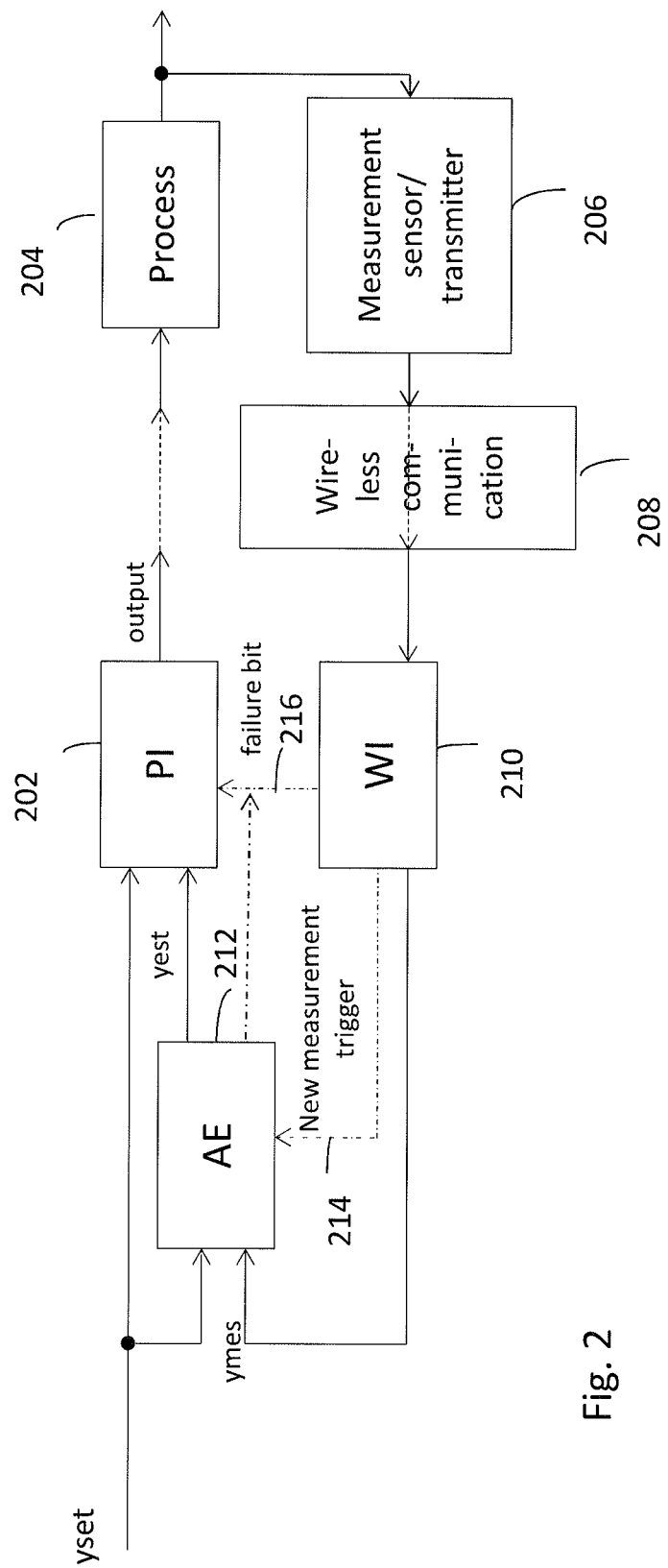
FIG. 2 is a schematic block diagram illustrating a closed-loop control according to an exemplary embodiment of the invention.

The present invention can be applied in connection with any automation system (process control system) and any industrial process or the like. The industrial processes 2 may include, but are not limited to, processes in a processing industry, such as pulp and paper, oil refining, petrochemical and chemical industries, or processes in power plants, etc. There are various architectures for an automation system. For example, the automation system may be a Direct Digital Control (DDC) system, or a Distributed Control System (DCS), or Field Control System (FCS), all well known in the art. One example of such a decentralized automation system is Metso DNA (DNA, Dynamic Network of Applications) delivered by Metso Corporation. The process automation system typically comprises a supervising computer, which contains process controllers or which is connected to the process controllers via a data network. Process controllers are typically connected by field buses to field devices, e.g. control valves, which may have their own control unit. A control loop may comprise e.g. a process controller, a field device and a measured feedback from the process to the process controller. A process automation system may also comprise software or hardware for tuning control loops. Process automation systems, control loops and tuning systems are described in the copending Finnish patent application 990360, for example, which is incorporated as a reference herein. Only a few examples of process automation systems are described above. It is to be noted that the implementation method of an industrial process and a process automation system is not relevant for the present invention A simplified block diagram of a process control loop according to an exemplary embodiment of the invention is shown in FIG. 2. A control loop may comprise e.g. a process controller 202 controlling a field device in a process 204 and a measured feedback from the process 204 to the process controller 202. A measurement sensor/transmitter 206 may be connected directly to the process 204 and may measure a desired process variable (such as temperature, pressure, level, flow, etc) and may convert the measured process variable into an analog or digital electric signal for transmission to the controller. The measurement sensor/transmitter 206 may be located remote from the controller 202 and transmit the measured variable to the controller 2 using a wireless communication link 208. The wireless measurement signal may be received at a wireless interface unit 210 on the controller side. The wireless interface unit 210 may pass the received measurement signal ymes to an adaptive estimator 212. The wireless interface unit 210 may also generate and output to the adaptive estimator 212 a trigger signal indicating a reception of a new measurement. A setpoint of a control loop, yset, may also be inputted to both the adaptive estimator 212 and the controller 202. Based on the setpoint yset, the last received measurement value yset, and the trigger signal 214, the adaptive estimator 212 then may generate and output an estimated measurement value yest to the controller 202. More specifically, when triggered by a trigger signal 214 from the wireless interface 210, i.e. when a new measurement value is received, the adaptive estimator 212 may set its output yest to the new value measurement value ymes. Otherwise, between consecutive trigger signals, the adaptive estimator 212 gradually moves the estimated measurement value ymes towards the setpoint yset according to a predetermined estimation algorithm or process. As a result, when a measurement is received, it is passed to the controller 202. When there is a long interval between two consecutive receptions of measurement values, the estimated measurement value yest approaches towards the setpoint value yset, thus maintaining the control loop stable. Thus, embodiments of the invention provide a secured stability and an acceptable performance during communication problems. The controller 202 need not know about the inventive process, from the controller 202 point of view it receives normal measurement values like in the conventional control loop. An advantage of using the adaptive estimator 212 according to the exemplary embodiment of the invention is that any standard controller may be employed as the controller 202; no special type of controller, such as PID PLUS is needed. The possibility of using same PI/PID controller block both in wired control and wireless control offers a plurality of further advantages, such as same functionality and same user interface.

In exemplary embodiments of the invention, the controller 202 may be a PI (Proportional, Integral) controller or a PID (Proportional, Integral, Derivative) controller. With proportional band, the controller output is proportional to the error or a change in measurement. With a proportional controller offset (deviation from set-point) is present. Increasing the controller gain will make the loop go unstable. Integral action may typically be included in a controller to eliminate this offset. Integral, sometimes called reset, provides additional action to the original proportional response as long as the process variable remains away from the set point. Integral is a function of the magnitude and duration of the deviation. Integral compensates for process and set point load changes. With derivative action, the controller output is proportional to the rate of change of the measurement or error. The controller output is calculated by the rate of change of the measurement with time. Derivative action can compensate for a changing measurement. Thus derivative takes action to inhibit more rapid changes of the measurement than proportional action. When a load or set-point change occurs, the derivative action causes the controller gain to move the "wrong" way when the measurement gets near the set-point. Derivative is often used to avoid overshoot. Choosing the proper values for P, I, and D is called "PID Tuning". It is desirable to be able to use standard PI or PID controllers as far as possible, because their operation, performance and tuning is well known, and all extra designing and development work is avoided.

Figure 3:
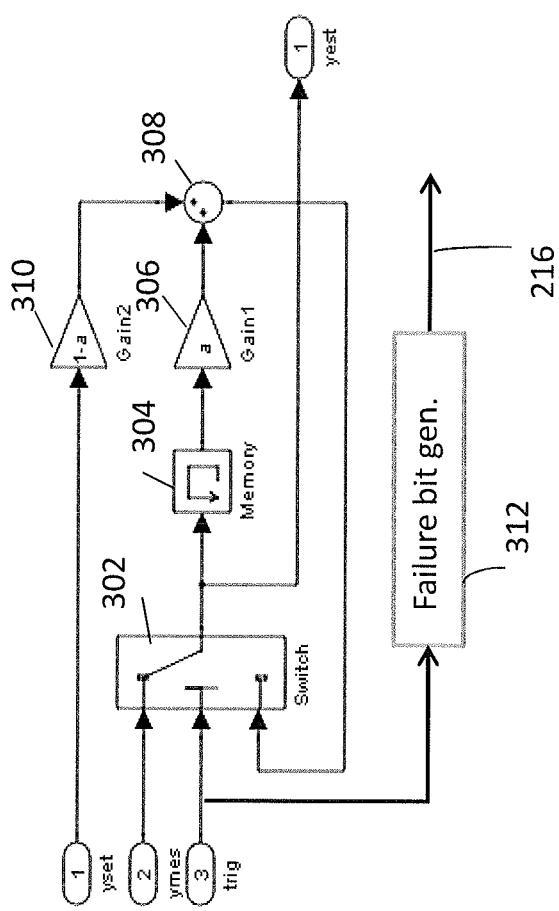
FIG. 3 is a schematic block diagram illustrating an adaptive estimator according to an exemplary embodiment of the invention.

An exemplary implementation of the adaptive estimator 212 is illustrated in a schematic block diagram is shown in FIG. 3. Setpoint yset, measurement ymes, and trigger signal 214 are supplied to inputs 1, 2 and 3 of the adaptive estimator 212, respectively, and estimated measurement yest is outputted at output 1 of the adaptive estimator 212. The trigger signal (input 3) is configured to control a switch device 302 to couple either the measurement ymes or an estimated value to form the estimated measurement at the output 1. When the trigger variable (trig) at the input 3 is active (in response to receiving a new measurement value at the wireless interface 210), the value of the received measurement ymes at the input 2 is passed to the output 1 to form the estimated measurement value yest. Otherwise, when the trigger signal is inactive (i.e. between consecutive received measurement values), an estimated feedback value is coupled to the output 1 by the switch device 302 to form the value of estimated measurement yest (output 1). The value of estimated measurement yest is gradually moved towards value of yset at the input 1. The gradual change can be implemented in various ways. An example implementation using a gain (amplifier) block 308 with a first gain a, a second gain block 310 with a second gain (1−a), and a sum block 310 is shown in FIG. 3. The set point value yset at input 1 is supplied to the gain block 310, amplified by the gain (1−a) and inputted to the sum block 308. The value of the estimated measurement yest is stored in the memory block 304 at a sampling rate 1/Ts and outputted from the memory block 304 to the gain block 306, wherein Ts=sample time of the adaptive estimator 212. Preferably the sample time Ts (or the time interval at which the estimated process measurement is updated by the estimation process) may be equal to an execution interval of the process controller 202. The gain block 306 amplifies the measurement value yest by the gain 'a' and inputs the amplified yest to the sum block 308. The sum block 308 sums the two amplified inputs and provides an output which fulfils the equation yest(new)=(1−a)*yset+a*yest(old). The value of the a parameter, used in the "Gain1" and "Gain2" blocks, may be a constant or it may be changed with the time between two consecutive received process measurement values (e.g. between two last received values), denoted Tsamp herein. For example, the a parameter may be defined as a=exp(−Ts/T), where T=time constant, which is preferably the estimated closed-loop constant of the control loop. Typically this value is not known, but it may be a function of the time Tsamp between two consecutive received process measurement values and the integration time Ti of the PI/PID controller. For example, T may be obtained by calculating arithmetic average T=0.5*(Ti+Tsamp).

It may also be said that an adaptive estimator 212 according to an exemplary embodiment performs a lowpass filter function reset at each reception of a new measurement value (e.g. at active trigger signal). An exemplary filter algorithm, for a first order filter with gain 1 and time constant (Ti+Tsamp)/2, may be:

```
when reset:
  yest = ymes
otherwise:
  yest = a*yest + (1-a)*yset
  where
  a = exp(-2*Ts/(Ti+Tsamp))
End
```

Figure 4:
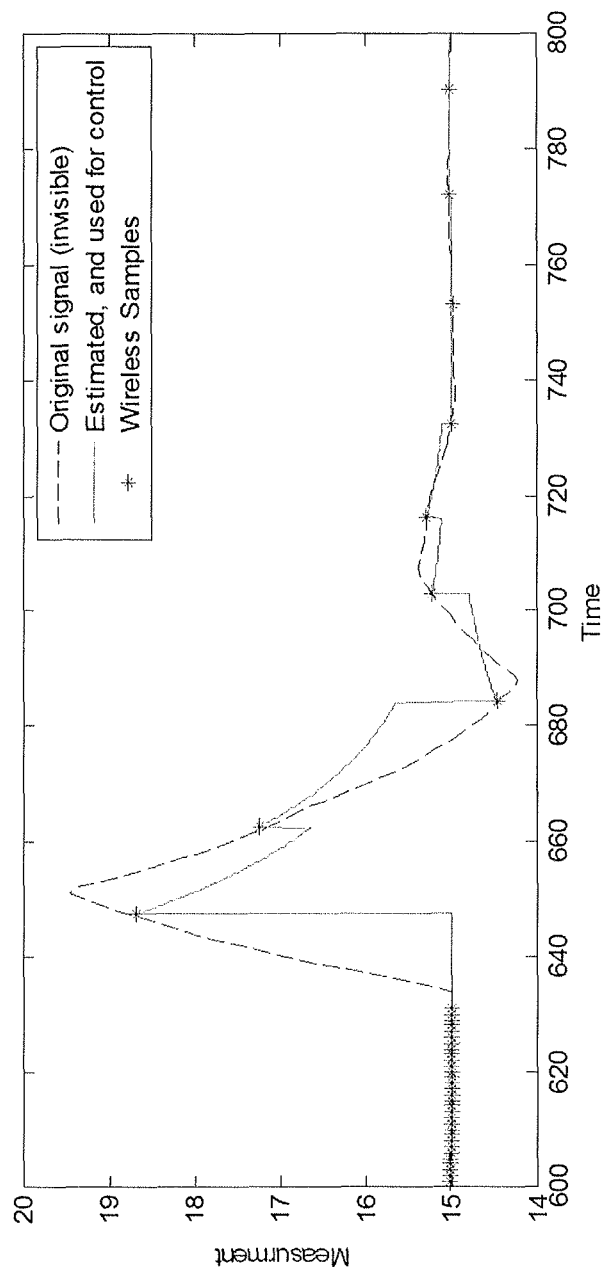
FIG. 4 is a graph illustrating simulation results of an example embodiment of the present invention.

Simulation results according to an example embodiment of the present invention are illustrated in FIG. 4. The original measurement signal (which accurately represents the actual measured process variable) at the measurement sensor/transmitter 206 is depicted by a dash-line graph. The measurement signal may be transmitted over the wireless communication link 210 as discrete samples, e.g. in data packets. The discrete "wireless" samples received at the wireless interface 212 are depicted by an asterisk (*) graph. Finally, the estimated measurement value yest provided by the adaptive estimator 212 and inputted to the controller 202 for control action is depicted by the solid-line graph. In the time period 0-630 seconds, the wireless samples are received normally (no samples are lost), and all graphs naturally correspond to each other accurately. After the 630 seconds instant, there is a break in the wireless communication and wireless samples are lost, the next wireless sample being received at 650 seconds. Meanwhile, the value of the original measurement has changed from value 15 to value 18.7, but the estimated measurement has maintained the value 15 due to the communication problems. Upon receiving the wireless sample value 18.7 at 650 seconds, the adaptive estimator 212 updates the value of the estimated measurement ymes to value 18.7 in a single step. Then there is again a break in the wireless communication until the time 665 seconds, where a wireless sample with value 17.2 is received, and the value of the estimated measurement yest is updated to value 17.2 in a single step. Between instants 650 seconds and 665 seconds, the adaptive estimator gradually moves the value of the estimated measurement yest towards the setpoint value, which in the example case means that the value of the estimated measurement yest gradually decreases to value 16.8. The estimation follows the shape of original signal quite well but at lower level, which results in a step upwards due to the update at 665 seconds. After the 665 seconds instant there is again break in the wireless communication until 683 seconds where an update to value 14.5 is made. Now the estimation has decreased slower than the original signal, and which results in a step downwards due to the update at 683 seconds. Similarly, later in time, wireless samples are received and the estimated measurement signal yest is updated at irregular intervals, while the between the received wireless samples, the adaptive estimator provides estimated values to the controller 202. As can be seen in FIG. 4, the estimated measurement signal yest follows quite well the original signal, in spite of the severe communication problems.

Figure 5:
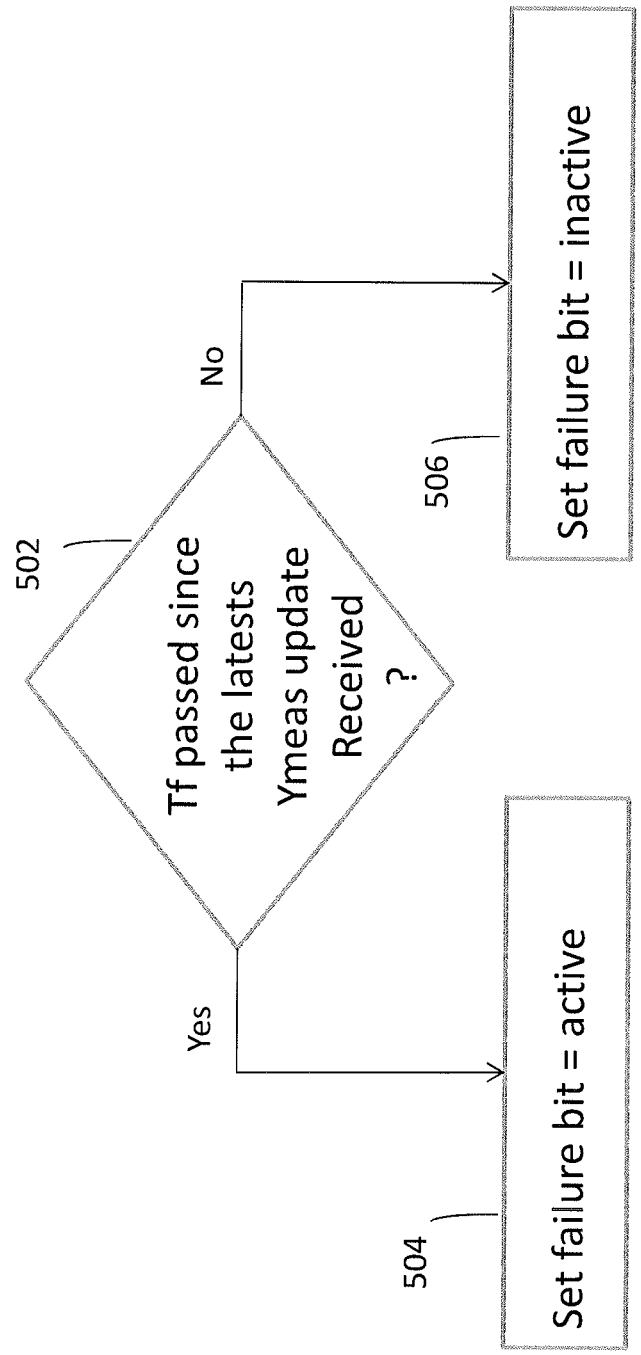
FIG. 5 is a flow diagram illustrating a failure bit generating method according to an exemplary embodiment of the invention.

As illustrated above, in accordance with embodiments of the invention, an irregular wireless measurement is converted to a regular measurement that is used by a controller, such as a standard controller designed for wired control. Such a controller may need information about communication failure, such as a failure bit, in order to be able to transit to an operation mode wherein an appropriate and stable control operation is assured also during long communication breaks. For that purpose, in an exemplary embodiment of the invention, a failure indication 216, such as a failure bit or a failure flag, may be provided to the controller 202 during long breaks in the wireless communication 208. In contrast to a conventional wired control, which instantly raises a failure bit during communication problems, a wireless control system according to an embodiment of the invention may tolerate some minor communication breaks without providing a failure indication to the controller. An example implementation of providing a failure indication 216 is illustrated in FIG. 5. The failure bit 216 may be raised (set active) (step 504) when a predefined time Tf (e.g. 1 min) has passed after reception of last measurement update (step 502). Otherwise, if a predefined time Tf has not passed after reception of last measurement update (step 502), the failure bit 216 is not raised (it is set or maintained inactive) (step 50). The time Tf is substantially longer than a nominal time Tsamp between two consecutive received measurement updates during a normal operation, preferably 100-10000 times longer.

In an embodiment of the invention the failure indication (e.g. failure bit) may be provided by the wireless interface 210, as illustrated by a dash-line arrow 216 in FIG. 2. In an exemplary embodiment of the invention, in a case where a communication failure indication is received by a wireless interface block 210 from another part of the wireless communication system, it may readily be delivered to the controller 202 as a failure indication 216.

In a further embodiment of the invention the failure indication (e.g. failure bit) may be provided by the adaptive estimator 212, as also illustrated by a dash-line arrow 216 in FIG. 2. An example implementation of a failure bit generator 312 is illustrated in FIG. 3. The failure bit generator 312 may implement the method of FIG. 5, for example. The failure bit 216 may be raised (set active) (step 504) when a predefined time Tf has passed after reception of last trigger signal (i.e. last measurement update) (step 502). Otherwise, if a predefined time Tf has not passed after reception of last trigger signal (i.e. last measurement update) (step 502), the failure bit 216 is not raised (it is set or maintained inactive) (step 50). The failure bit generation 312 may be implemented, for example, as a timer which is reset at each reception of the trigger signal. The failure indication 216 (e.g. failure bit) may be a separate signal, as illustrated in FIG. 2, or it may be included in the estimated measurement signal yest, e.g. it may comprise one or more bits, a flag or a field in the estimated measurement signal yest In an embodiment of the invention, the adaptive estimator block or function 212 may be implemented in the same computing or hardware unit with the controller block 202, or they may be integrated into one device. It should be appreciated that the adaptive estimator according to embodiments of the invention may be at the measurement input of the controller also in case of a wired connection or otherwise reliable connection. The adaptive estimator may then be configured to permanently couple the measurement signal ymes to the controller (e.g. by fixing the trigger input to active state).

For controllers operating on control error (error=setpoint−measurement), the adaptive estimator 212 according exemplary embodiments of the invention may be arranged to the adaptive estimator 212 generates an error estimate, which gradually moves towards zero during communication breaks, in place of the estimated measurement value ymes." Although exemplary embodiments of the invention are described with a wireless communication of measurements from a measurement sensor/transmitter, it should be appreciated that embodiments of the invention may be applied also with a wired communication of measurements from a measurement sensor/transmitter, or with a combination of wired and wireless communications, while achieving same advantages regarding a tolerance to irregular measurement updates or delays in communication. In such a case, a trigger signal or like is received from an appropriate communication interface or like.

The techniques described herein may be implemented by various means. For example, these techniques may be implemented in hardware (one or more devices), firmware (one or more devices), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) and executed by one or more processors/computers. The data storage medium or the memory unit may be implemented within the processor/computer or external to the processor/computer, in which case it can be communicatively coupled to the processor/computer via various means as is known in the art. Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

The description and the related figures are only intended to illustrate the principles of the present invention by means of examples. Various alternative embodiments, variations and changes are obvious to a person skilled in the art on the basis of this description. The present invention is not intended to be limited to the examples described herein but the invention may vary within the scope and spirit of the appended claims.

The invention claimed is:

1. A method, comprising
measuring at a remote measurement device at least one process parameter in an industrial process,
receiving, by a process controller, from said remote measurement device a wired or wireless communication carrying measured values of said at least one process parameter,
controlling, by said process controller, said industrial process using said received process measurement values carried in the received communication, and
if the communication from the remote measurement device fails, controlling, by said process controller, said industrial process using estimated process measurement values, said estimated process measurement values being generated based at least on the last received process measurement value and a setpoint signal.

2. The method according to claim 1, wherein said generating of the estimated process measurement value comprises gradually increasing or decreasing the estimated process measurement values from the last received process measurement value towards the setpoint value according to a predetermined estimation process until reception of a next process measurement value, and upon receiving the next process measurement value, updating the estimated process measurement value with the received next process measurement value.

3. The method according to claim 2, wherein said predetermined estimation process implements a filter function which is reset by received process measurement values.

4. The method according to claim 2, wherein a time constant of the predetermined estimation process is fixed or dependent on a time interval between two consecutively received process measurement values.

5. The method according to claim 4, wherein the predetermined estimation process implements a filter yest(new)=(1−a)*yset+a*yest(old), where
yest (new)=new estimated process measurement value,
yest (old)=previous estimated process measurement value,
yset=setpoint value
a is a parameter, used in the implementation of the filter.

6. The method according to claim 5, wherein a=exp(−Ts/T), where
Ts=sampling time in generating estimated process measurement values, and
T=time constant.

7. The method according to claim 1, comprising
providing a failure indication to the process controller during long breaks in the communication from the remote measurement device.

8. The method according to claim 7, comprising providing a failure indication to the process controller during long breaks in the communication from the remote measurement device, when a predefined time has passed after reception of the last process measurement value, said predefined time being longer than a nominal time between two consecutive received measurement values during a normal communication.

9. The method according to claim 7, wherein the failure indication is provided by a communication interface receiving the communication from the remote measurement device.

10. The method according to claim 7, wherein the failure indication is provided in association with generating the estimated process measurement parameters.

11. The method according to claim 1, wherein said communication comprises a wired communication, a wireless communication, or a combination thereof.

12. A method of providing process measurements to a process controller of an industrial process, comprising
measuring, by a remote measurement device, at least one process parameter in an industrial process,
receiving, by a process controller, from said remote measurement device a wired or wireless communication carrying measured values of said at least one process parameter,
controlling, by said process controller, said industrial process using an error signal between said received process measurement values and a setpoint signal,
if the communication from the remote measurement device fails, controlling, by said process controller, said industrial process using an error signal between estimated process measurement values and said setpoint signal, said estimated process measurement values being generated based at least on the last received process measurement value and a setpoint signal.

13. An apparatus, comprising
a process controller configured to control an industrial process using process measurement values of at least one process parameter carried in a wireless or wired communication received from a remote measurement device measuring said at least one process parameter in said industrial process;
wherein said process controller is further configured to control said industrial process using estimated process measurement values if the communication from the remote measurement device fails, said estimated process measurement values being generated based at least on the last received process measurement value and a setpoint signal.

14. A system, comprising
a remote measurement device configured to measure least one process parameter in an industrial process, and
a process controller configured to control the industrial process using said process measurement values of said at least one process parameter carried in a wireless or wired communication from said remote measurement device if said communication is successful,
wherein said process controller is further configured to control said industrial process using estimated process measurement values to the process controller if the communication from the remote measurement device fails, said estimated process measurement values being generated based at least on the last received process measurement value and said setpoint signal.

15. An apparatus, comprising
a process controller configured to receive a wireless or wired communication from a remote measurement device measuring at least one process parameter in an industrial process, said communication carrying process measurement values of said at least one process parameter,
wherein said process controller is further configured to control the industrial process using an error signal between said received process measurement values and a setpoint signal if said communication is successful, and
wherein said process controller is yet further configured to control the industrial process using an error signal between estimated process measurement values and said setpoint signal if the communication from the remote measurement device fails, said estimated process measurement values being generated based at least on the last received process measurement value and said setpoint signal.

16. A system, comprising
a remote measurement device configured to measure at least one process parameter in an industrial process,
a process controller configured to receive a wireless or wired communication from said remote measurement device, said communication carrying process measurement values of said at least one process parameter,
wherein said process controller is configured to control said industrial process using an error signal between said received process measurement values and a setpoint if said communication is successful, and
wherein said process controller is further configured to control said industrial process using an error signal between estimated process measurement values and said setpoint signal if the communication from the remote measurement device fails, said estimated process measurement values being generated based at least on the last received process measurement value and said setpoint signal.

17. A non-transitory computer readable storage device comprising instructions thereon executable by a process controller operably coupled to the storage device which, when executed by the process controller, carry out the functions of:
receiving, by the process controller, a wireless or wired communication from a remote measurement device measuring at least one process parameter in an industrial process, said communication carrying measured values of said at least one process parameter,
controlling, by the process controller, said industrial process using said received process measurement values
if the communication from the remote measurement device fails, controlling, by the process controller, said industrial process using estimated process measurement values, said estimated process measurement values being generated based at least on the last received process measurement value and a setpoint signal.

18. A non-transitory computer readable storage device comprising instructions thereon executable by a process controller operably coupled to the storage device which, when executed by the process controller, carry out the functions of:
receiving, by the process controller, a wireless or wired communication from a remote measurement device measuring at least one process parameter in an industrial process, said communication carrying measured values of said at least one process parameter,
controlling, by the process controller, said industrial process using an error signal between said received process measurement values and a setpoint signal,
if the communication from the remote measurement device fails, controlling, by the process controller, said industrial process using an error signal between estimated process measurement values and said setpoint signal, said estimated process measurement values being generated based at least on the last received process measurement value and said setpoint signal.

* * * * *